US012054978B2

(12) United States Patent
Soderqvist

(10) Patent No.: US 12,054,978 B2
(45) Date of Patent: Aug. 6, 2024

(54) SWING DOOR-BASED ENTRANCE SYSTEM WITH IMPROVED OPERABILITY IN EMERGENCY MODE

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 298 days.

(21) Appl. No.: 17/618,069

(22) PCT Filed: Jun. 9, 2020

(86) PCT No.: PCT/EP2020/065901
§ 371 (c)(1),
(2) Date: Dec. 10, 2021

(87) PCT Pub. No.: WO2020/254142
PCT Pub. Date: Dec. 24, 2020

(65) Prior Publication Data

US 2022/0307316 A1 Sep. 29, 2022

(30) Foreign Application Priority Data

Jun. 17, 2019 (SE) .................................. 1930198-5

(51) Int. Cl.
*E05F 15/00* (2015.01)
*E05F 15/611* (2015.01)
(Continued)

(52) U.S. Cl.
CPC ............ *E05F 15/72* (2015.01); *E05F 15/611* (2015.01); *E05F 15/73* (2015.01);
(Continued)

(58) Field of Classification Search
CPC ......... E05F 15/63; E05F 15/616; E05F 15/73; E05F 1/105; E05F 1/10; E05Y 2201/41;
(Continued)

(56) References Cited

U.S. PATENT DOCUMENTS 4,727,679 A 3/1988 Kornbrekke et al.
5,687,507 A 11/1997 Beran
(Continued)

FOREIGN PATENT DOCUMENTS

CA 3041080 6/2018
CN 109098610 12/2018
(Continued)

OTHER PUBLICATIONS

International Search Report in PCT/EP2020/065901 mailed Sep. 4, 2020.

(Continued)

*Primary Examiner* — Chi Q Nguyen
(74) *Attorney, Agent, or Firm* — Wissing Miller LLP

(57) ABSTRACT

An automatic door operator (30) in adapted for use in an entrance system (1) that comprises a swing door member (10) being operable between a closed position (18) which prevents passage, and an open position (19) which admits passage. The automatic door operator (30) has an electric motor (34), an activation sensor (15) configured for manual actuation by a person wishing to pass through the entrance system, and a controller (31) having a normal operating mode and an emergency mode. In the normal operating mode, the controller is responsive to the activation sensor (15) and configured for, when the activation sensor (15) is actuated, controlling the motor (34) to generate torque for causing the door member (10) in the entrance system (1) to
(Continued)

move from the closed position (18) to the open position (19), and to stay in the open position (19) during a configured hold open period (43).

11 Claims, 5 Drawing Sheets

(51) Int. Cl.
*E05F 15/72* (2015.01)
*E05F 15/73* (2015.01)

(52) U.S. Cl.
CPC ... *E05Y 2201/418* (2013.01); *E05Y 2201/434* (2013.01); *E05Y 2400/44* (2013.01); *E05Y 2800/25* (2013.01); *E05Y 2900/132* (2013.01)

(58) Field of Classification Search
CPC ......... E05Y 2201/422; E05Y 2201/315; E05Y 2015/631; E05Y 2400/33; E05Y 2400/456; E05Y 2400/502; E05Y 2400/54; E05Y 2900/134; E05Y 2400/45; E05Y 2900/132; E05Y 2800/113
See application file for complete search history.

(56) References Cited

U.S. PATENT DOCUMENTS

| | | | | |
|---|---|---|---|---|
| 5,878,530 | A | 3/1999 | Eccleston et al. | |
| 6,225,768 | B1 | 5/2001 | Cookson et al. | |
| 10,472,873 | B2 * | 11/2019 | Ladha | E05F 3/102 |
| 10,808,445 | B2 * | 10/2020 | Hucker | E05F 5/027 |
| 11,072,965 | B2 * | 7/2021 | Soderqvist | E05F 15/72 |
| 11,085,212 | B2 * | 8/2021 | Rivaya | E05B 81/76 |
| 11,162,292 | B2 * | 11/2021 | Soderqvist | E05F 15/603 |
| 11,168,508 | B2 * | 11/2021 | Dreyer | E05F 15/40 |
| 11,203,893 | B2 * | 12/2021 | Soderqvist | E05F 15/72 |
| 11,230,872 | B2 * | 1/2022 | Paulsson | E05F 15/60 |
| 11,248,410 | B2 * | 2/2022 | Dreyer | E05F 15/603 |
| 11,384,588 | B2 * | 7/2022 | Soderqvist | H02P 29/50 |
| 11,536,075 | B2 * | 12/2022 | Soderqvist | E05F 1/105 |
| 11,536,078 | B2 * | 12/2022 | Dreyer | E05F 15/73 |
| 11,697,960 | B2 * | 7/2023 | Soderqvist | E05F 15/63 49/70 |
| 2016/0370789 | A1 | 12/2016 | Zasowski et al. | |

FOREIGN PATENT DOCUMENTS

| | | |
|---|---|---|
| DE | 102016210777 | 8/2017 |
| EP | 3067504 | 9/2016 |
| WO | 2018104258 | 6/2018 |

OTHER PUBLICATIONS

Swedish Search Report in 1930198-5 mailed Jan. 30, 2020.

Chinese Office Action in 2020800441351, dated mailed Feb. 15, 2023.

* cited by examiner

SWING DOOR-BASED ENTRANCE SYSTEM WITH IMPROVED OPERABILITY IN EMERGENCY MODE

This application is a 371 of PCT/EP2020/065901, filed on Jun. 9, 2020, published on Dec. 24, 2020 under publication number WO 2020/254142, which claims priority benefits from Swedish Patent Application No. 1930198-5, filed on Jun. 17, 2019, the disclosure of which is incorporated herein by reference.

TECHNICAL FIELD

The present invention generally relates to entrance systems having a swing door member and an automatic door operator for causing movement of the swing door member between a closed position which prevents passage, and an open position which admits passage. More specifically, the present invention relates to an automatic door operator and entrance system with improved operability in emergency mode, and to an associated method of operating an entrance system.

BACKGROUND

Entrance systems having automatic door operators are frequently used for providing automatic opening and closing of one or more movable door members in order to facilitate entrance and exit to buildings, rooms and other areas. The door members are often swing doors. Other types of automated entrance systems have, for instance, sliding door or revolving doors.

In swing door-based entrance systems, there is at least one swing door member having a door leaf. The door leaf is pivotally hinged to a door frame to allow opening of the swing door member from a closed position to an open position, as well as for allowing closing of the swing door member from the open position to the closed position. A motorized automatic door operator is included in the entrance system and is capable of causing opening of the swing door member. A linkage in the form of a mechanical arm system connects the automatic door operator to the door leaf of the swing door member.

The purpose of automatic door operators in swing door-based entrance systems is to provide automatic opening of the swing door member in various possible applications. Such applications include, for instance, facilitating a disabled person's access to his or her private home, providing passage through entrance ports or internal doors at health-care buildings, office premises, industries or retail stores, providing comfort access to hotel rooms, etc.

Swing door-based entrance systems may also be used in fire door applications. In such applications, the swing door member has a fire proof door leaf having a fire resistant core made of suitable material. Fire doors are arranged to stop or delay the transfer of thermal energy, i.e. heat, from one side of the door to the opposite side. Moreover, the automatic door operator may comprise a forced close arrangement which is adapted to provide mechanical energy from a preloaded spring via a transfer mechanism to the linkage, so as to cause forced closing of the door leaf with respect to the door frame in the event of a fire alarm.

The automatic door operator causes opening of the swing door member by an electric motor which generates torque that is transferred to the swing door member via the linkage. The operation of the electric motor is controlled by a control arrangement in the automatic door operator. Since an entrance system with an automatically operated swing door member is a potentially hazardous environment for people and objects that might be hit or jammed by the moving swing door member, an entrance system needs to satisfy various technical standard requirements, the purpose of which is to safeguard that the operation of the swing door member is performed in an accurately controlled manner.

The control arrangement typically includes a controller, one or more activation sensors, and one or more safety sensors.

The activation sensors are used for triggering the automatic door operator to actuate the electric motor and generate torque that is transferred to the swing door member to open it. Activation sensors may be automatic in the sense that they are adapted to detect an approaching user from some distance (without requiring physical interaction by the user) and accordingly trigger the automatic door operator to open the swing door member. Examples of such automatic activation sensors are IR sensors, images sensors and radar sensors. There are also activation sensors that operate by manual actuation by a user to trigger the automatic door operator to open the swing door member. Examples of such manual activation sensors are mechanical push buttons (such as "elbow switch" actuators) and touch sensors.

The safety sensors are configured to monitor a respective zone at or near the swing door member for presence or activity of a person or object in positions where there is a risk of getting hit or jammed. In order to provide user convenience and long-term operational stability and at the same time prevent injuries or damages to present, approaching or departing persons or objects, the controller controls the operation of the automatic door operator—and therefore the automatic movement of the swing door member—based on the output signals from the activation sensors and safety sensors.

For increased convenience and reduced risk of accidents, swing door-based entrance systems often have a hold open function. Certain requirements, for instance ANSI 156.19, requires a minimum hold open period of, for instance, 5 seconds after opening of a swing door member by an automatic door operator. During the hold open period, the controller keeps on actuating the electric motor to prevent the swing door member from closing. The hold open function is, for instance, convenient when the automatic door operator is used at a hotel room and the user carries luggage when entering the hotel room for the first time. Other examples are when a handicapped person enters through a restroom door, or a patient at a hospital enters or exits a nursing room.

The automatic door operator is often configured to provide a predefined hold open period, such as the aforementioned 5 seconds after triggering by an activation sensor (automatic or manual). However, this time may not be sufficient in some situations, for instance when the passing user has a reduced movement capacity, carries bulky objects, is accompanied by children or pets, etc. To this end, the user may extend the hold open period by keeping a manual activation sensor actuated for as long as the user finds appropriate, in effect making a manual override of the configured (default) hold open period. Hence, by depressing for instance an "elbow switch" actuator for 10 seconds, the effective hold open period will be extended to at least 10 seconds, and typically a few seconds more depending on configuration of the entrance system. The control arrangement of the automatic door operator monitors a manual activation sensor to detect a change in voltage of the output activation signal. When the user actuates the manual activation sensor, an electric switch will be switched from an open circuit state (essentially infinite resistance and therefore an output voltage essentially corresponding to a supply voltage, such a +5 V) to a closed circuit state (essentially zero resistance and therefore essentially zero output voltage). The control arrangement of the automatic door operator is therefore configured to detect an edge in the output voltage from the manual activation sensor when the output voltage level changes from +5 V to 0 V.

To allow manual override of the default hold open period as described above, the control arrangement of the automatic door operator will moreover have to monitor a voltage level of the output activation signal from the manual activation sensor. If the voltage level remains at 0 V when the configured (default) hold open period has lapsed, this is understood by the control arrangement as the user making a manual override by keeping the manual activation sensor actuated.

In buildings where people with disabilities and restricted movement are typically staying, such as for example hospitals or elderly care centers, the automated entrance systems are required to work and provide escape routes even when there is smoke present. This may conflict with the generally most important purpose of a fire door, i.e. to entrap the fire by closing as fast possible.

During smoky conditions the safety sensors of the control arrangement may detect smoke and therefore prevent closing of the swing door member due to the sensors not being able to separate between smoke and an actual person or object in the vicinity of the swing door member.

To circumvent this issue, automated entrance systems may be configured to disable the safety sensors when a fire alarm is active. This allows people to pass and escape during emergency situations, while still allowing the swing door member to close so as to entrap the fire during smoky conditions. Hold open functionality is believed to be an important safety feature that facilitates for people to escape through the open swing door member in an emergency situation.

However, the present inventor has realized that the prior art approach is exposed to a risk situation. If the smoky condition is severed and turns into an actual fire, then massive heat generation will occur. The massive heat may melt either the manual activation sensor (e.g. "elbow switch" actuator) itself, or the electrical wiring that connects the sensor to the control arrangement of the automatic door operator. In either case, a short circuit may occur that causes the output activation signal to go permanently low (0 V). In turn, this will fool the automatic door operator not only to open the swing door member (in response to the edge in the output voltage when the short circuit occurs), but moreover to keep the swing door member open for a long, undefined hold open period (because the short circuit keeps the output voltage level low). As a result, the automatic door operator will fail to force close the swing door member to entrap the fire when really needed.

Accordingly, the present inventor has realized that there is room for improvements in the field of swing door-based entrance systems.

SUMMARY

An object of the present invention is therefore to provide one or more improvements when it comes to solving or at least mitigating the problem identified and explained above.

Accordingly, a first aspect of the present invention is an automatic door operator for use in an entrance system that comprises a swing door member being operable between a closed position which prevents passage, and an open position which admits passage. The automatic door operator comprises an electric motor, an activation sensor configured for manual actuation by a person wishing to pass through the entrance system, and a controller having a normal operating mode and an emergency mode.

In the normal operating mode, the controller is responsive to the activation sensor and configured for, when the activation sensor is actuated, controlling the motor to generate torque for causing the door member in the entrance system to move from the closed position to the open position, and to stay in the open position during a configured hold open period. The controller is further configured for, when the configured hold open period has lapsed and the activation sensor is maintained actuated, controlling the motor to generate torque for causing the door member to remain in the open position during an extended hold open period.

In the emergency mode, the controller is responsive to the activation sensor and configured for controlling the motor, when the activation sensor is actuated, to generate torque for causing the door member in the entrance system to move from the closed position to the open position, to stay in the open position during the configured hold open period, but ignore a spurious indication of a maintained actuation of the activation sensor and thereby prevent the door member from remaining in the open position during an extended hold open period.

The provision of such an automatic door operator will solve or at least mitigate the problem identified in the background section of this document, as will be clear from the following detailed description section and the drawings.

A second aspect of the present invention is an entrance system that comprises a swing door member being operable between a closed position which prevents passage, and an open position which admits passage, and an automatic door operator as defined above for the first aspect of the present invention.

The provision of such an entrance system will solve or at least mitigate the problem identified in the background section of this document, as will be clear from the following detailed description section and the drawings.

A third aspect of the present invention is a method of operating an entrance system which comprises a swing door member being operable by an automatic door operator between a closed position which prevents passage, and an open position which admits passage. The method involves detecting actuation of an activation sensor by a person wishing to pass through the entrance system. The method further involves operating the automatic door operator to cause movement of the swing door member between the closed position and the open position, and to keep the swing door member in the open position during a configured hold open period. The method moreover involves detecting that the activation sensor is maintained actuated when the configured hold open period has lapsed. Unless the automatic door operator operates in an emergency mode different from a normal operating mode, the automatic door operator is operated to keep the swing door member in the open position during an extended hold open period. When the automatic door operator operates in the emergency mode, the method instead ignores a spurious indication of the activation sensor being maintained actuated when the configured hold open period has lapsed, thereby preventing the swing door member from remaining in the open position during an extended hold open period.

The provision of such a method will solve or at least mitigate the problem identified in the background section of this document, as will be clear from the following detailed description section and the drawings.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something, or "capable of" doing something in this document is intended to mean the same as the entity being "arranged for", "configured for" or "adapted for" doing this very something, and vice versa.

BRIEF DESCRIPTION OF THE DRAWINGS

Objects, features and advantages of embodiments of the invention will appear from the following detailed description, reference being made to the accompanying drawings.

DETAILED DESCRIPTION OF EMBODIMENTS

Figure 1:
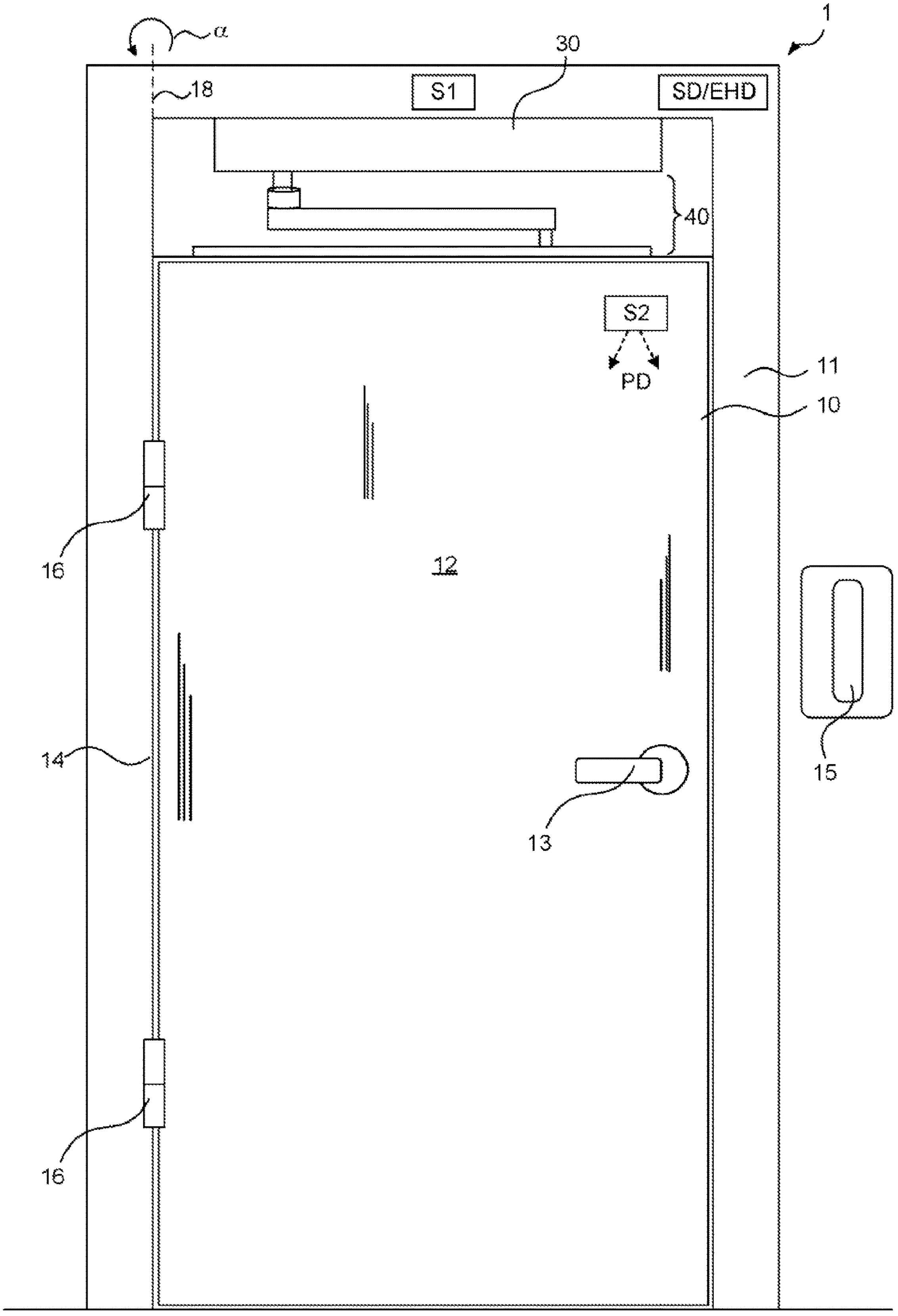
FIG. 1 is a schematic block diagram of one embodiment of an entrance system having a swing door member and an automatic door operator.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 is a schematic front view of a swing door-based entrance system. The entrance system 1 comprises a swing door member 10 having a door leaf 12.

The swing door member 10 is pivotally supported at a vertical edge 14 by hinges 16 for allowing opening of the swing door member 10 from a closed position to an open position, as well as for allowing closing of the swing door member 10 from the open position to the closed position. The swing door member 10 is hence supported by a door frame 11 for pivotal motion around a rotational axis 18 which is coincident with the hinges 16.

The entrance system 1 comprises a motorized automatic door operator 30 capable of causing opening of the swing door member 10. A linkage (arm mechanism) 40 connects the automatic door operator 30 to the door leaf 12 of the swing door member 10. The door operator 30 may be arranged in conjunction with the door frame 11 and is typically a concealed overhead installation in or at the door frame 11 (hence, the linkage mechanism 40 and automatic door operator 30 are normally not as visible to the naked eye as appears to be the case in FIG. 1).

The automatic door operator 30 may be triggered by sensor equipment in the entrance system 1. In the embodiment of FIG. 1, the sensor equipment includes activation sensors for this purpose. A first activation sensor S1 is automatic in the sense that it is adapted to detect an approaching user/person from some distance, without requiring physical interaction by the user/person, and accordingly trigger the automatic door operator 30 to open the swing door member 10. The automatic activation sensor may typically be implemented as an IR sensor, an image sensor or a radar sensor.

The sensor equipment in the entrance system 1 shown in FIG. 1 further includes a second activation sensor 15 which is configured for manual actuation by a user/person wishing to pass through the entrance system 1, wherein the manual actuation triggers the automatic door operator 30 to open the swing door member 10. The manual activation sensor 15 may typically be implemented as a mechanical push button, such as an "elbow switch" actuator as can be seen in FIG. 1.

The entrance system 1 will typically also allow the user/person to open or close the swing door member 10 by pulling or pushing a door handle 13 by manual force, i.e. without using the motorized automatic door operator 30.

The automatic door operator 30 may provide automatic opening of the swing door 10 in various possible applications. Such applications include, for instance, facilitating a disabled person's access to his or her private home, providing access through entrance ports or internal doors at healthcare buildings, office premises, industries or retail stores, providing comfort access to hotel rooms, etc.

Figure 5:
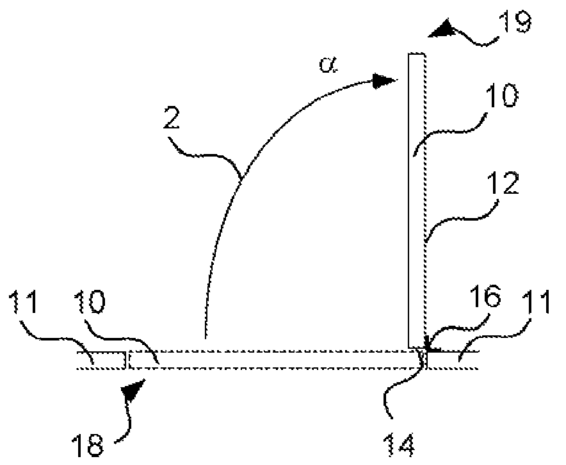
FIG. 5 illustrates movement of the swing door member from a shut closed position to a swung open position.

FIG. 5 illustrates the opening of the swing door member 10 in one embodiment of the entrance system 1 from a shut closed position 18 to a swung open position 19. The opening movement is indicated by an arrow 2. As can be seen in FIG. 5, during the opening 2 of the swing door member 10, the door leaf angle $\alpha$ will span from about 0° to about 90°, or slightly more than 90°. In other embodiments, the swung open position may be at a door leaf angle $\alpha$ different from about 90°, such as for instance about 180°.

Figure 6:
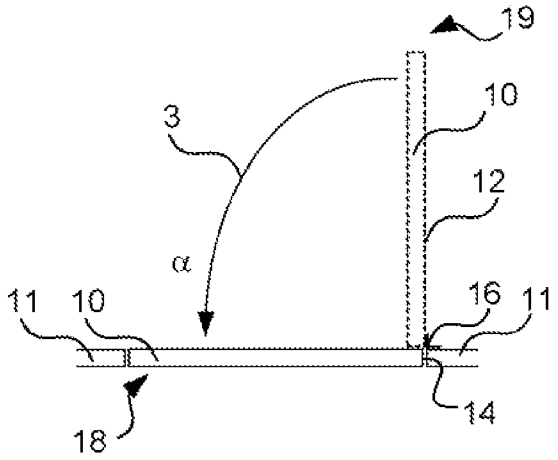
FIG. 6 illustrates movement of the swing door member from the swung open position to the shut closed position.

FIG. 6 correspondingly illustrates the closing of the swing door member 10 of the entrance system 1 from the swung open position 19 to the shut closed position 18. The closing movement is indicated by an arrow 3. As can be seen in FIG. 6, during the closing 3 of the swing door member 10, the door leaf angle $\alpha$ will span from about 90°, or slightly more than 90°, to about 0°. In other embodiments where the swung open position is at a door leaf angle $\alpha$ different from about 90°, such as for instance about 180°, the door leaf angle α will of course start spanning from such other door leaf angle α.

To avoid dangerous situations where a present, approaching or departing person or object (including but not limited to pets or articles brought by the person) might be hit or jammed by the door leaf 12 of the swing door member 10, the entrance system 1 further comprises a safety sensor S2. The safety sensor S2 is typically mounted to the door leaf 12 at an appropriate position on the surface of the door leaf 12. As can be seen in FIG. 1, such a position is often at an uppermost part of the door leaf 12.

The purpose of the safety sensor S2 is to monitor a zone PD, or volume, at or near the door leaf 12 for presence or activity of a person or object. If a person or object is detected in the monitored zone, the automatic door operator 30 shall not be allowed to move the swing door member 10 in a direction in which the swing door member 10 may hit or jam that person or object. Accordingly, the automatic door operator 30 is configured to receive monitoring data from the safety sensor S2. If the monitoring data indicates presence or activity of a person or object in the monitored zone, the automatic door operator 30 is configured to refrain from driving a motor of the automatic door operator 30 to cause movement of the swing door member 10, and/or force the motor to stop an ongoing movement of the swing door member 10.

Figure 2:
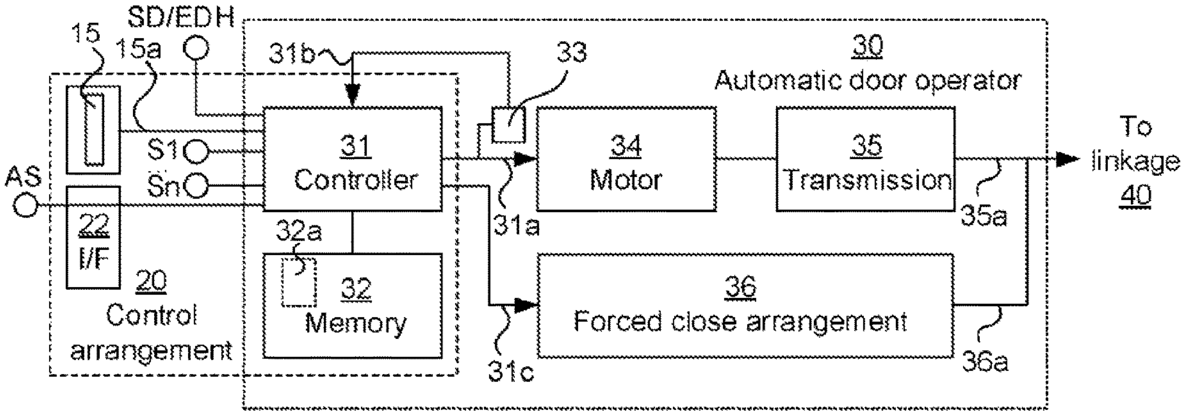
FIG. 2 is a schematic block diagram of an automatic door operator according to one embodiment.

Reference is now made to FIG. 2 which illustrates an embodiment of the automatic door operator 30 in more detail. The automatic door operator 30 is adapted for use in the entrance system 1 that, as already mentioned, comprises the swing door member 10 which is operable between the closed position 18, in which passage is prevented, and the open position 19, in which passage is admitted.

The automatic door operator 30 comprises a motor 34, typically an electrical motor, being connected to a transmission 35. An output shaft 35*a* of the transmission 35 rotates upon activation of the motor 34 and is connected to the linkage 40. The linkage 40 translates the motion of the output shaft 35*a* into an opening motion of the door leaf 12 with respect to the door frame 11 (c.f. opening movement 2 in FIG. 5).

The automatic door operator 30 also comprises a control arrangement 20 including a controller 31 which is configured for performing different functions of the automatic door operator 30. One or more of these functions relates to opening of the door leaf 12 with respect to the door frame 11. Accordingly, the controller 31 has a control output 31*a* connected to the motor 34 for controlling the actuation thereof.

In addition to the controller 31, the control arrangement 20 comprises a number n of sensor functions, including or consisting of the aforementioned first activation sensor S1, second activation sensor 15 and safety sensor S2. The sensor functions are operatively connected with the controller 31 to report detection results or measurement readings to the controller 31.

A revolution counter 33, such as an encoder or other angular sensor, is provided at the motor 34 to monitor the revolution of a motor shaft of the motor 34. The revolution counter 33 is connected to an input 31*b* of the controller 31. The controller 31 is configured to use one or more readings of the revolution counter 33, typically a number of pulses generated as the motor shaft rotates, for determining a current angular position, e.g. door leaf angle α, of the door leaf 12 of the swing door member 10.

The controller 31 may be implemented in any known controller technology, including but not limited to microcontroller, processor (e.g. PLC, CPU, DSP), FPGA, ASIC or any other suitable digital and/or analog circuitry capable of performing the intended functionality. The controller 31 may be implemented as a single unit or as a cluster of units in a cooperative configuration for providing the functionalities as described in this document.

The controller 31 has an associated memory 32. The memory 32 may be implemented in any known memory technology, including but not limited to E(E)PROM, S(D)RAM or flash memory. In some embodiments, the memory 32 may be integrated with or internal to the controller 31. As seen at 32*a*, the memory 32 may store program instructions for execution by the controller 31, as well as temporary and permanent data used by the controller 31.

The embodiment of the automatic door operator 30 shown in FIG. 2 is intended for fire door usage and includes a forced close arrangement 36. The forced close arrangement 36 is adapted to provide mechanical energy via a transfer mechanism to the linkage 40, so as to cause forced closing of the door leaf 12 with respect to the door frame 11 in the event of a fire alarm. In the disclosed embodiment, the forced close arrangement 36 comprises a helical compression spring.

During opening of the swing door member 10 by the torque generated by the motor 34, the compression spring is tensioned by the rotation of the output shaft 35*a*, as can be seen at 36*a*. During the forced closing cycle, the accumulated spring force of the compression spring is transferred to the output shaft 35 at 36*a* by means of the transfer mechanism, which in the disclosed embodiment includes a pressure roller that acts on a cam curve being connected to the output shaft 35*a*. In other embodiments, the forced close arrangement 36 may comprise a different kind of spring, and its transfer mechanism may comprise a different kind of mechanism.

The controller 31 may receive an alarm signal AS via a communication interface 22 and generate a control signal 31*c* to the forced close arrangement 36, so as to cause release of the accumulated spring force.

The swing door-based entrance system 1 has a hold open function, as was described in the Background section of this document. During the hold open period, the controller 31 keeps on actuating the electric motor 34 to prevent the swing door member 10 from closing. This facilitates passage through the entrance system 1.

The automatic door operator 30 has a configured hold open period, such as 5 seconds, after triggering by the activation sensor 15 (or S1). The configured hold open period may be a default hold open period predefined already at manufacturing, or a hold open period subsequently defined by an installer or service person during configuration or service of the entrance system 1. As explained in the Background section, the configured hold open period may be insufficiently long in some situations, and the user may thus extend the hold open period by keeping the manual activation sensor 15 actuated for as long as the user finds appropriate, in effect making a manual override of the configured hold open period. Hence, by actuating the manual activation sensor 15 (for instance in the form of a depressible "elbow switch" actuator) for 10 seconds, the effective hold open period will be extended to at least 10 seconds, and typically a few seconds more depending on configuration of the entrance system.

Figure 3:
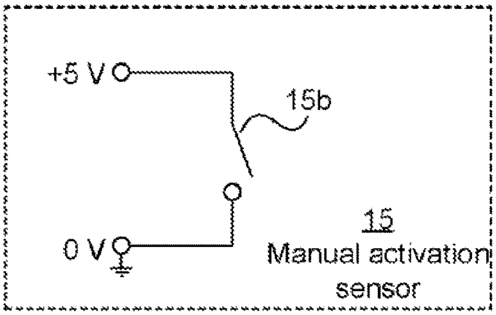
FIG. 3 is a schematic block diagram of an activation sensor configured for manual actuation by a person wishing to pass through the entrance system.

The controller 31 of the automatic door operator 30 monitors the manual activation sensor 15 to detect a change in voltage of the output activation signal 15*a* from the sensor 15. When the user actuates the manual activation sensor 15, an electric switch 15*b* (see FIG. 3) will be switched from an open circuit state (essentially infinite resistance and therefore an output voltage essentially corresponding to a supply voltage, such a +5 V) to a closed circuit state (essentially zero resistance and therefore essentially zero output voltage).

Figure 4:
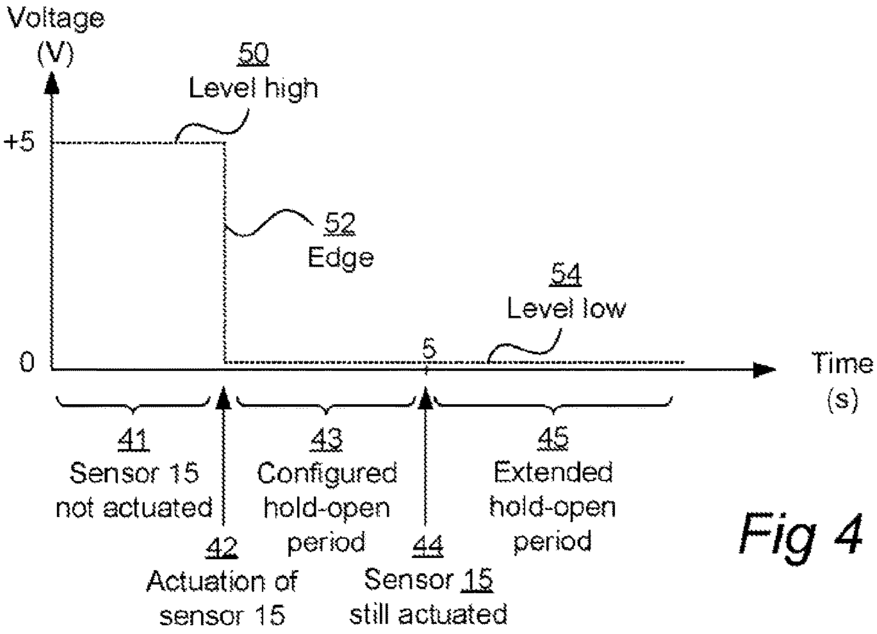
FIG. 4 is a schematic diagram illustrating hold-open functionality for the swing door member.

As is illustrated in FIG. 4, the controller 31 of the automatic door operator 30 is therefore configured to monitor the output voltage from the manual activation sensor 15. When the manual activation sensor 15 has not yet been actuated (see 41), the output voltage level 50 will be high, e.g. at supply voltage level such as +5 V, since the electric switch 15*b* is in the open circuit state.

As the user actuates the manual activation sensor 15 at 42, the electric switch 15*b* will switch to the closed circuit state. The controller 31 is configured to detect a resulting edge 52 in the output voltage from the manual activation sensor 15 when the output voltage level changes at 52 from high (e.g. +5 V) to low (e.g. about 0 V). Accordingly, the automatic door operator 30 causes the swing door member 10 to open and remain open during the configured hold open period 43 by actuation of the motor 34.

To allow manual override of the configured hold open period 43, the controller 31 of the automatic door operator 30 moreover monitors the voltage level of the output activation signal 15*a* from the manual activation sensor 15 when the configured hold open period 43 lapses. As seen at 44 in FIG. 4, if the user keeps the manual activation sensor 15 actuated, the voltage level will remain at the low level 54 when the configured hold open period has lapsed. The controller 31 of the automatic door operator 30 is configured to interpret this as a manual override of the configured hold open period and thus keep on actuating the motor 34 to keep the swing door member 10 in the open position during an extended hold open period, which is seen at 45 in FIG. 4.

As was touched upon in the Background section of this document, it is desired to keep automated entrance systems operative even when there is an emergency situation, such as smoke and fire. This will allow people to pass and escape more easily during the emergency situation. The hold-open functionality is seen in this context as an important safety feature since it facilitates the passage of people through the entrance system.

The following problematic situation is recalled from the Background section of this document. If the emergency situation develops into an actual fire, then massive heat generation will occur. The massive heat may melt either the manual activation sensor 15, or the electrical wiring that connects the sensor 15 to the control arrangement 20 of the automatic door operator 30. In either case, a short circuit may occur that causes the output activation signal 15*a* to go permanently low (see 54 in FIG. 4, about 0 V), spuriously indicating a permanently closed switch 15*b*. The automatic door operator 30 would then not only open the swing door member 10 in response to the edge 52 in the output voltage when the short circuit occurs, but also keep the swing door member 10 open for a long, undefined hold open period—because the short circuit keeps the output voltage level low. As a result, the automatic door operator 30 would fail to close the swing door member to entrap the fire when really needed.

In the disclosed embodiment of the present invention, this problem has been solved as follows.

The controller 31 of the automatic door operator 30 has a normal operating mode and an emergency mode. The automatic door operator 30 has an emergency detection function which is configured for detecting an emergency situation. The emergency detection function may be implemented as or associated with a smoke detector SD, and/or an excessive heat detector EHD, that may be mounted at an appropriate position in the entrance system 1, as is exemplified in FIG. 1. Alternatively or additionally, the emergency detection function may be implemented as or associated with the communication interface 22, being capable of receiving an external alarm signal such as the aforementioned alarm signal AS (see FIG. 2). Being in the normal operating mode, the controller 31 is responsive to the emergency detection function and configured for switching to the emergency mode.

In the normal operating mode, the controller 31 is responsive to the activation sensor 15 and configured for the following functionality. When the activation sensor 15 is actuated, the controller 31 in response controls the motor 34 to generate torque for causing the swing door member 10 in the entrance system 1 to move from the closed position 18 to the open position 19, and to stay in the open position 19 during the configured hold open period 43. When the configured hold open period 43 has lapsed and the activation sensor 15 is maintained actuated (see 44, FIG. 4), the controller 31 controls the motor 34 to generate torque for causing the swing door member 10 to remain in the open position 19 during the extended hold open period 45. Subject to configuration of the entrance system 1, the extended hold open period 45 typically lasts as least during the duration of the maintained actuation of the activation sensor 15, possibly a few seconds longer if the system is set up in that way.

In the emergency mode, the controller 31 is responsive to the activation sensor 15 and configured for the following functionality. When the activation sensor 15 is actuated, the controller 31 in response controls the motor 34 to generate torque for causing the swing door member 10 in the entrance system 1 to move from the closed position 18 to the open position 19, and to stay in the open position 19 during the configured hold open period 43. In contrast to the normal operating mode, the controller 31 is configured in the emergency mode to ignore a spurious indication of a maintained actuation 44 of the activation sensor 15 and thereby prevent the door member 10 from remaining in the open position 19 during an extended hold open period 45.

As previously explained, the safety sensor S2 is typically disabled in the emergency mode, to avoid spurious detection of smoke which may otherwise be mistaken for a person or object and thus prevent door opening or stop an ongoing opening of the door.

In the disclosed embodiment, the above functionality has been implemented as follows. Beneficial use is made of the fact that the activation sensor 15 comprises the aforementioned switch 15*b* which is in an open circuit state when the manual activation sensor 15 is not actuated and switches from the open circuit state to a closed circuit state when the manual activation sensor 15 is actuated. As has been explained above, the open circuit state causes the output activation signal 15*a* from the activation sensor 15 to have a first output voltage level 50, whereas the closed circuit state causes the output activation signal 15*a* from the activation sensor 15 to have a second output voltage level 54, different from the first output voltage level 50. It is recalled that in the disclosed embodiment, the first output voltage level 50 essentially corresponds to a supply voltage and the second output voltage level 54 essentially corresponds to zero voltage or ground.

In the normal operating mode, the controller 31 is responsive to the activation sensor 15 by being triggerable both by the edge 52 and by a level (or more specifically the low level 54) of the output activation signal 15*a* from the activation sensor 15.

In the emergency mode, on the other hand, the controller 31 is responsive to the activation sensor 15 by being triggerable by the edge 52 but not by the level 54 of the output activation signal 15*a* from the activation sensor 15.

Accordingly, the automatic door operator 30 can remain operative also in a situation of emergency, e.g. involving smoke or fire, and may in particular offer hold-open functionality to facilitate evacuation through the entrance system 1, at the same time preventing hazardous extended hold-open caused by a spurious constant low voltage level in the output activation signal 15*a* from the activation sensor 15, due to component melt-down and a resulting short circuit.

Figure 7A:
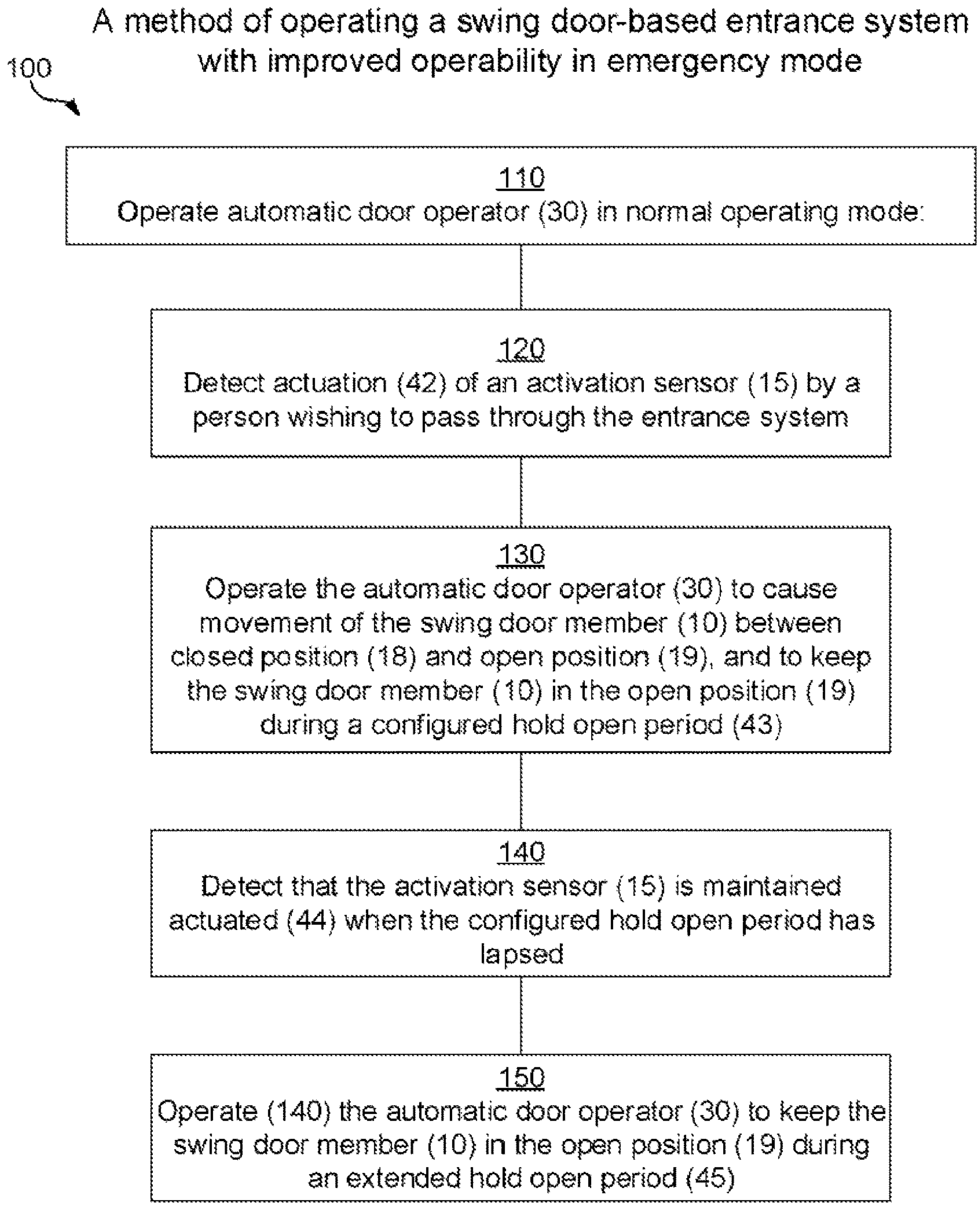
FIG. 7A is a flowchart diagram illustrating a method of operating a swing door-based entrance system in a normal operating mode.
Figure 7B:
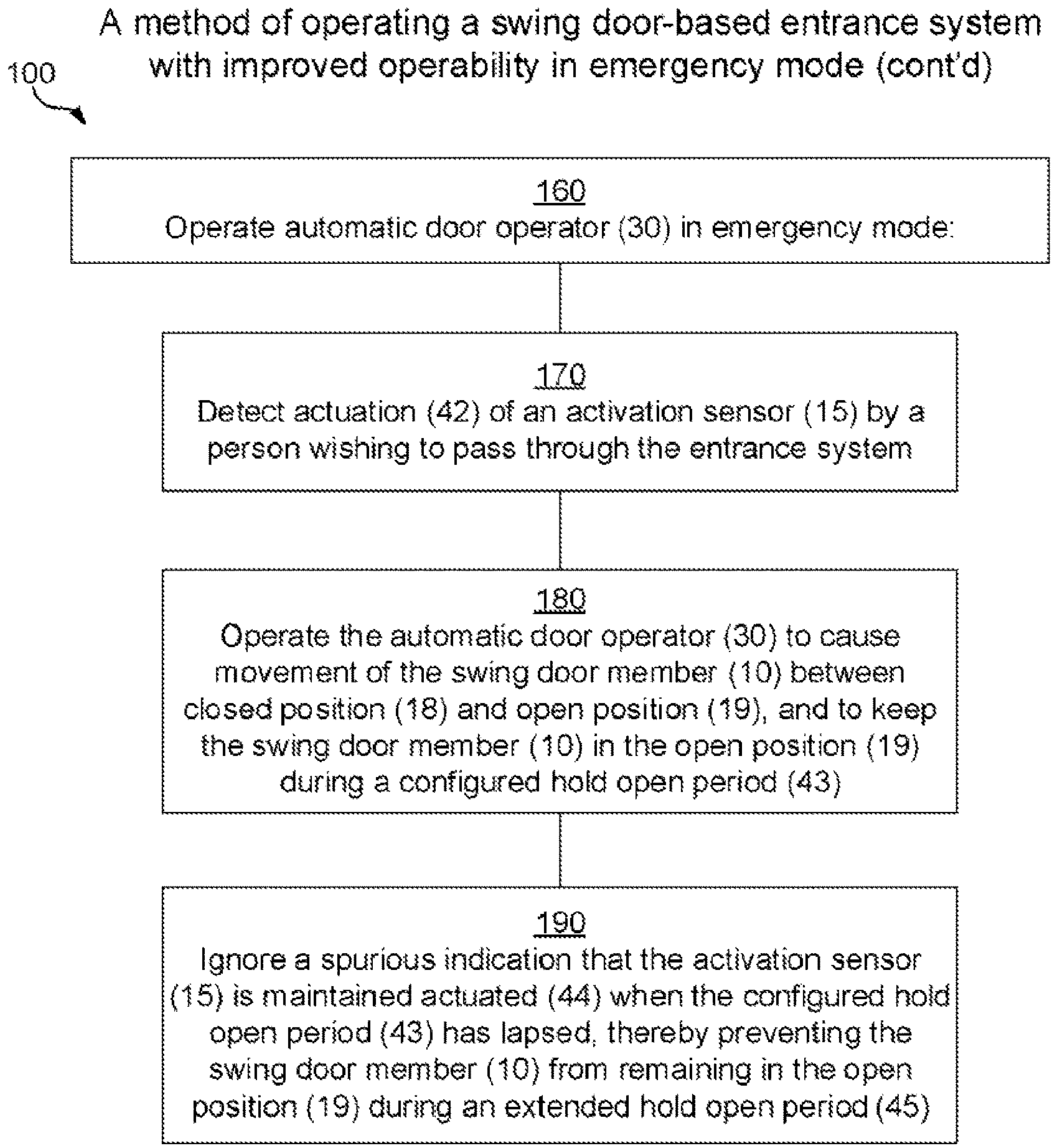
FIG. 7B is a flowchart diagram illustrating a method of operating a swing door-based entrance system in an emergency mode.

The functionality performed in accordance with the present invention as described herein is illustrated as a method 100 in the flowchart diagram shown in FIGS. 7A and 7B. FIG. 7A illustrates the functionality of the method 100 when the automatic door operator 30 operates in normal operating mode 110. FIG. 7B illustrates the functionality of the method 100 when the automatic door operator 30 operates in emergency mode 160, different from the normal operating mode 110.

As is understood from FIGS. 7A and 7B, the method 100 involves a step 120 (in the normal operating mode 110) and 170 (in the emergency mode 160), respectively, of detecting actuation 42 of the activation sensor 15 by a person wishing to pass through the entrance system 1.

The method 100 then involves a step 130 (in the normal operating mode 110) and 180 (in the emergency mode 160), respectively, of operating the automatic door operator 30 to cause movement of the swing door member 10 between the closed position 18 and the open position 19, and to keep the swing door member 10 in the open position 19 during a configured hold open period 43.

In the normal operating mode 110, the method 100 then involves detecting in a step 140 that the activation sensor 15 is maintained actuated 44 when the configured hold open period 43 has lapsed, and operating in a step 150 the automatic door operator 30 to keep the swing door member 10 in the open position 19 during an extended hold open period 45.

This is unless the entrance system 1 operates in the emergency mode 160. If so, as seen at 190 in FIG. 7B, the method 100 instead ignores a spurious indication of the activation sensor 15 being maintained actuated 44 when the configured hold open period 43 has lapsed, thereby preventing the swing door member 10 from remaining in the open position 19 during an extended hold open period 45

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system having one or more movable door member not limited to any specific type.

The invention claimed is:

1. An automatic door operator for use in an entrance system that comprises a swing door member being operable between a closed position wherein the door member prevents passage, and an open position wherein the door member admits passage, the automatic door operator comprising:

an electric motor;

an activation sensor configured for manual actuation by a person wishing to pass through the entrance system; and a controller having a normal operating mode and an emergency mode, wherein, in the normal operating mode, the controller is responsive to the activation sensor and configured for:

controlling the motor in response to actuation of the activation sensor to generate torque for causing the door member in the entrance system to move from the closed position to the open position, and to stay in the open position during a configured hold open period, and following the hold open period and while the activation sensor is maintained actuated, controlling the motor to generate torque for causing the door member to remain in the open position during an extended hold open period;

wherein, in the emergency mode, the controller is responsive to the activation sensor and configured for controlling the motor in response to the activation sensor being actuated, to generate torque for causing the door member in the entrance system to move from the closed position to the open position, to stay in the open position during the configured hold open period, but ignore a spurious indication of a maintained actuation of the activation sensor and thereby prevent the door member from remaining in the open position during an extended hold open period.

2. The automatic door operator as defined in claim 1, wherein:

in the normal operating mode, the controller is responsive to the activation sensor by being triggerable both by an edge and by a level of an output activation signal from the activation sensor; and in the emergency mode, the controller is responsive to the activation sensor by being triggerable by the edge but not by the level of the output activation signal from the activation sensor.

3. The automatic door operator as defined in claim 2, wherein the activation sensor comprises a switch which is an open circuit state in response to the manual activation sensor not being actuated and switches from the open circuit state to a closed circuit state in response to the manual activation sensor being actuated, the open circuit state causing the output activation signal from the activation sensor to have a first output voltage level and the closed circuit state causing the output activation signal from the activation sensor to have a second output voltage level, different from the first output voltage level.

4. The automatic door operator as defined in claim 3, wherein the first output voltage level essentially corresponds to a supply voltage, and the second output voltage level essentially corresponds to zero voltage or ground.

5. The automatic door operator as defined in claim 1, wherein the extended hold open period lasts as least during the duration of the maintained actuation of the activation sensor.

6. The automatic door operator as defined in claim 1, further comprising an emergency detection function configured for detecting an emergency situation.

7. The automatic door operator as defined in claim 6, wherein the emergency detection function is selected from the group consisting of:

a smoke detector (SD);
an excessive heat detector (EHD); and
a communication interface capable of receiving an external alarm signal (AS).

8. The automatic door operator as defined in claim 6, wherein, in the normal operating mode, the controller is responsive to the emergency detection function and configured for switching to the emergency mode.

9. An entrance system comprising:
the swing door member being operable between the closed position which prevents passage, and then open position which admits passage; and
the automatic door operator as defined in claim 1.

10. A method of operating an entrance system comprising a swing door member being operable by an automatic door operator between a closed position wherein the door member prevents passage, and an open position wherein the door member admits passage, the method involving:
detecting actuation of an activation sensor by a person wishing to pass through the entrance system;
operating the automatic door operator to cause movement of the swing door member between the closed position and the open position, and to keep the swing door member in the open position during a configured hold open period;
detecting that the activation sensor is maintained actuated following the configured hold open period;
unless the automatic door operator operates in an emergency mode different from a normal operating mode, operating the automatic door operator to keep the swing door member in the open position during an extended hold open period; and
wherein, in the emergency mode, operating the automatic door operator to ignore a spurious indication of the activation sensor being maintained actuated following the configured hold open period, thereby preventing the swing door member from remaining in the open position during an extended hold open period.

11. The method as defined in claim 10, wherein:
in the normal operating mode, the actuation of the activation sensor by the person wishing to pass through the entrance system is detected as at least one of an edge of an output activation signal from the activation sensor or a level of the output activation signal from the activation sensor; and
in the emergency mode, the actuation of the activation sensor by the person wishing to pass through the entrance system is detected as an edge of the output activation signal from the activation sensor but not as a level of the output activation signal from the activation sensor.

* * * * *